Feb. 15, 1949.   W. H. ROUSE   2,461,659
MOTOR DRIVE
Filed June 12, 1947
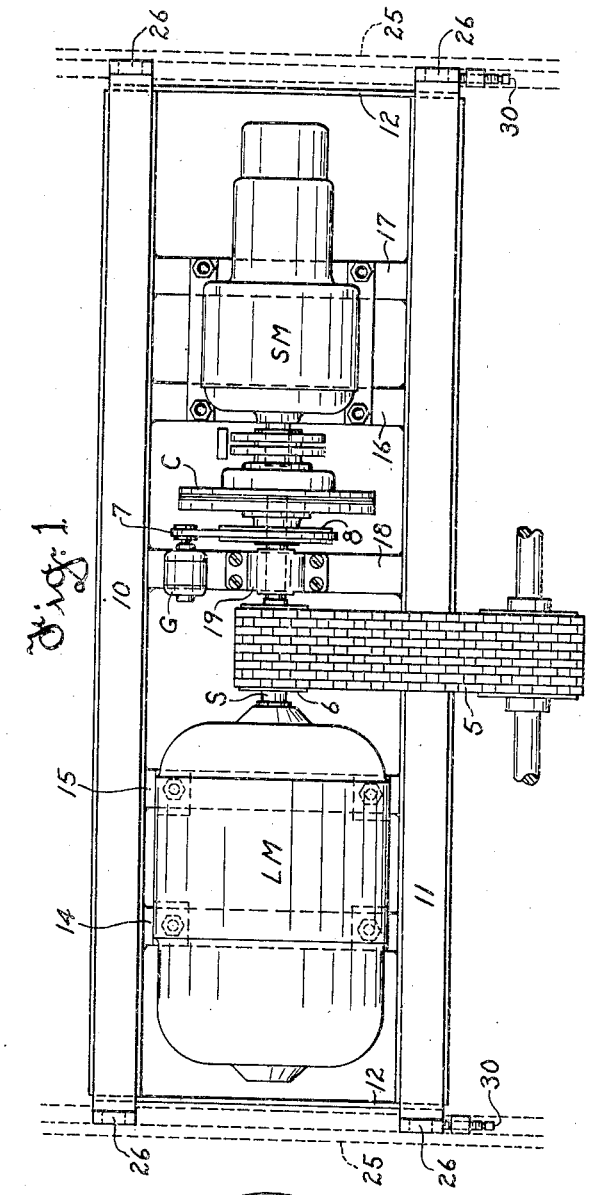
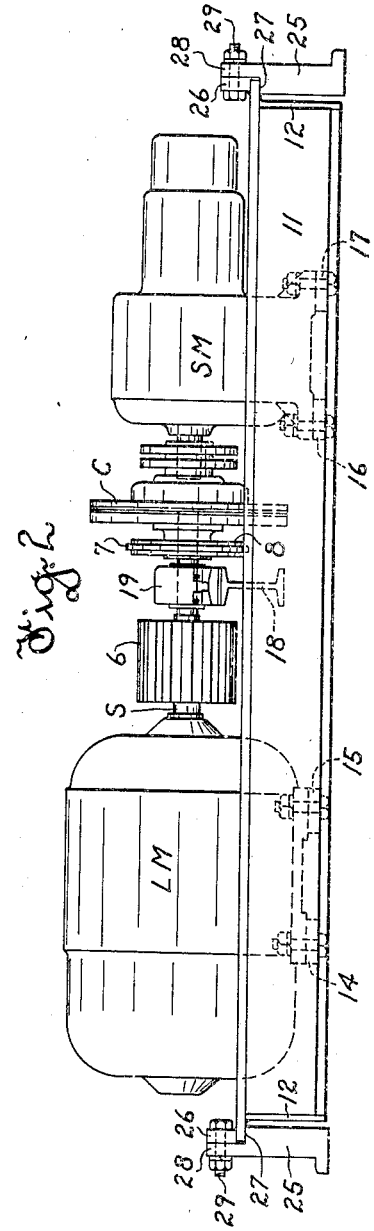
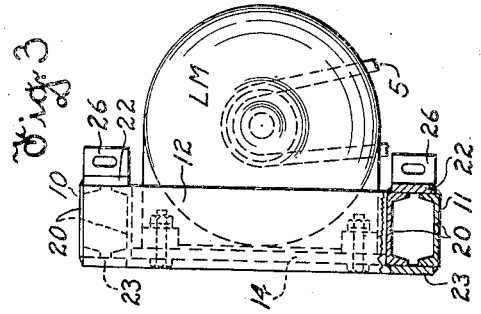
Inventor
William H. Rouse
By [signature]
Attorney Patented Feb. 15, 1949

2,461,659

UNITED STATES PATENT OFFICE 2,461,659

MOTOR DRIVE

William H. Rouse, Greenfield, Wis., assignor to Cutler-Hammer, Inc., Milwaukee, Wis., a corporation of Delaware Application June 12, 1947, Serial No. 754,113

7 Claims. (Cl. 171—252)

This invention relates to motor drive units for printing presses and other machines.

A type of drive to which the invention is especially applicable comprises reduction gearing, a small motor driving through such reduction gearing for starting and inching, and a larger motor for running, drive by said motors being made selective through the medium of control including a magnetic clutch in the driving connections. Such drives are commonly quite massive and it has been customary to mount the elements thereof on a heavy bed-plate of a thickness adding materially to the height of the unit and also to the weight of the unit. On the other hand, it has become important especially in printing plants to hold to a minimum the vertical dimension of such drives.

The present invention has among its objects to provide for drives of the aforementioned and other types improved supporting means having numerous advantages including a material reduction in the height and weight of the unit of which it forms a part.

The various additional objects and advantages of the invention will be apparent upon consideration of the embodiment thereof shown and described herein.

The accompanying drawings show a preferred embodiment of the invention, it being understood that the embodiment illustrated is susceptible of various modifications without departing from the scope of the appended claims.

In the drawings,

Figure 1 is a top plan view of the drive unit;

Fig. 2 is a side elevational view of the unit, and

Fig. 3 is an end elevational view of the unit.

Referring to Fig. 1, the drive comprises a small motor unit SM having built into it the desired reduction gearing. This type of unit being well known, the reduction gearing and other details are not shown. Further the unit comprises a large motor LM in axial alignment with unit SM, a shaft S to which the rotor of the large motor is directly connected and to which the rotor of the small motor may be connected through the aforementioned reduction gearing by an electromagnetic clutch of well known form. With the large motor LM deenergized and with the small motor and clutch energized the small motor drives the shaft S through the reduction gearing. On the other hand, with the clutch C deenergized and with the large motor LM energized said motor drives the shaft S, the small motor being disconnected from shaft S. As illustrated the drive from the unit is effected through a chain 5 passing over a suitable drive pulley 6 fixed to shaft S.

Fig. 1 additionally shows a small generator G having a belt connection 7 with a pulley 8 fixed to shaft S, such generator being provided in some instances for supply of control current and in other instances being omitted.

The support for the aforedescribed elements comprises parallel girders 10 and 11 spaced to receive therebetween the aligned motors, said girders being connected at their extremities by end plates 12. Thus is provided a skeleton supporting frame to be afforded support at opposite ends of the girders, said girders carrying adjacent their bottom faces cross bars 14 and 15 to support the large motor LM and cross bars 16 and 17 to support the small motor unit SM. Thus the motors are supported within the frame with an under-slung characteristic whereby the height of the unit is only that of the motors plus the thickness of the cross bars supporting the same. Additionally the girders carry an I-beam cross bar 18 for support of a bearing 19 for the shaft S and for support of generator G if the latter is employed.

As best shown in Fig. 3, each girder preferably comprises two channel bars 20 arranged in opposed relation and united by a top plate 22, and a bottom plate 23, the latter being the same length as the channel bars and the former being somewhat longer to engage suitable end supports 25 for the frame. The parts of the girders are suitably united as by welding and the end plates 12 connecting the girders are united to the girders as by welding, thus producing a rigid frame which is rendered very stiff longitudinally by the girders. The cross bars 14, 15, 16, 17 and 18 likewise are suitably secured to the girders as by welding, the bars 14 to 17 preferably being made as thin as their load will permit, while the I-beam cross bar 18 is preferably of substantial height to afford a high degree of rigidity of the supporting frame transversely thereof. As shown in Fig. 2 the upper face of bar 18 is disposed above the top surfaces of the girders, said bar extending upwardly between the girders from points substantially below the upper faces of the girders, there being no need to minimize the height of bar 18 to reduce the height of the unit.

Preferably the girders 10 and 11 are provided with upstanding perforated lugs 26 united as by welding to the extremities of the top plates of said girders, such lugs affording a medium through which the unit may be bolted to its end supports 25. As best shown in Fig. 2, each end support 25 preferably is formed with a supporting ledge 27 and with an upstanding perforated wall 28 to which the lugs 26 of the frame may be bolted. Preferably the lugs 26 of the frame have openings of slot form for the bolts 29 whereby the unit may be shifted on the end supports for adjustment of the chain drive from shaft S, the end supports 25 being provided for that purpose with adjusting screws 30, Fig. 1, bearing against girder 11.

As will be apparent, the motors may be attached to their respective supporting bars in any preferred manner, as for example by bolts as shown in the drawings which show the motors equipped with the commonly provided perforated attaching lugs. Also as will be apparent, the bearing 19 for shaft S may be of any suitable form and fixed to the cross bar 18 in any suitable way. Thus detail showing of the bearing and its attachment have been omitted from the drawing for simplification of the drawing.

While the under-slung characteristic of this drive unit with consequent reduction in height thereof is very important said unit obviously has other points of merit including reduction in weight, adaptability with but slight modification to different sizes of drives, as well as to varying numbers and kinds of component parts and adaptability to inverted mounting.

What I claim as new and desire to secure by Letters Patent is:

1. The combination with a motor drive comprising a plurality of component parts including a motor, which parts require support individually, of a supporting structure comprising a pair of parallel girders affording therebetween a space into which the base portion of said motor is inset, and further comprising cross bars carried by said girders to support said component parts of said drive individually and in a relation one to another and to said girders such that projection from said girders of said drive parts perpendicularly of a plane common to the longitudinal axes of said girders does not exceed that of said motor and such that perpendicularly of said plane said girders are mainly in overlapping relation to said motor by virtue of said inset of the base portion of said motor.

2. The combination with a motor drive comprising a plurality of component parts including a motor, which parts require support individually, of a supporting structure comprising a pair of parallel girders affording therebetween a space into which the base portion of said motor is inset and further comprising cross bars carried by said girders to support said component parts of said drive individually and in a relation one to another and to said girders such that projection from said girders of said drive parts perpendicularly of a plane common to the longitudinal axes of said girders does not exceed that of said motor and such that perpendicularly of said plane said girders are mainly in overlapping relation to said motor by virtue of said inset of the base portion of said motor, said girders being terminally provided with means for attachment to end supports, and said girders individually comprising a pair of channel bars disposed in a parallel relation with their channel sides adjacent and said channel bars of the two girders being disposed edgewise for paralleling their parts of maximum width.

3. The combination with a motor drive comprising a relatively large motor, a shaft connected thereto and having a bearing spaced from said motor, a relatively small motor and a clutch between the latter motor and said shaft, of a supporting structure comprising a pair of parallel girders and cross bars carried by said girders to support separately and in axial alignment said motors and said shaft bearing, said girders extending longitudinally of such drive assembly and being in spaced relation to receive therebetween parts of said assembly, thereby to provide a unit which in height closely approximates the height of said large motor per se.

4. The combination with a motor drive comprising a relatively large motor, a shaft connected thereto and having a bearing spaced from said motor, a relatively small motor and a clutch between the latter motor and said shaft, of a supporting structure supporting said motors and said shaft bearing separately and in axial alignment, said supporting structure comprising a pair of girders extending longitudinally of such drive assembly and spaced to accommodate therebetween base portions of said motors and further comprising cross bars carried by said girders for support of said motors and said shaft bearing, certain of said cross bars being thin relative to said girders as measured between their top and bottom faces and being located adjacent the bottom faces of said girders, thereby to reduce to a height closely approaching the height of the large motor per se the unit comprising the drive assembly and supporting structure.

5. A supporting structure for a multi motor drive having its motors in axial alignment, which comprises a pair of girders extending lengthwise of the drive assembly and in spaced relation to receive therebetween the base portion of at least one of the motors, and further comprising cross bars carried by said girders for supporting separately component parts of the motor drive, certain of said cross bars being thinner than said girders as measured between their top and bottom faces and being located closely adjacent the bottom faces of said girders.

6. A supporting structure for a multi motor drive having its motors in axial alignment, which comprises a pair of girders extending lengthwise of the drive assembly and in spaced relation to receive therebetween the base portion of at least one of the motors, and further comprising cross bars carried by said girders for supporting separately component parts of the motor drive, certain of said cross bars being thinner than said girders as measured for height and being located closely adjacent the bottom faces of said girders, each of said girders comprising top and bottom plates and a pair of channel bars disposed edgewise between said plates with their channel sides in an adjacent relation.

7. A supporting structure for a multi motor drive having its motors in axial alignment, which comprises a pair of girders extending lengthwise of the drive assembly and in spaced relation to receive therebetween the base portion of at least one of the motors, and further comprising cross bars carried by said girders for supporting separately component parts of the motor drive, certain of said cross bars being thinner than said girders as measured for height and being located closely adjacent the bottom faces of said girders, each of said girders having at opposite ends means to attach the same to end supports and each comprising a pair of channel bars united in a parallel relation with their channel faces adjacently disposed, flat faces of channel bars of the two girders being disposed in a parallel and adjacent relation.

WILLIAM H. ROUSE.

REFERENCES CITED

The following references are of record in the file of this patent:

UNITED STATES PATENTS

| Number | Name | Date |
| --- | --- | --- |
| 1,751,100 | Sanderson et al. | Mar. 18, 1930 |